Nov. 14, 1967 J. W. DALZELL ETAL 3,352,490
AUTOMATIC SET-POINT CONTROL FOR THERMOSTATS
IN ROOM-HEATING SYSTEMS
Filed Aug. 28, 1964 3 Sheets-Sheet 1

INVENTORS
JAMES W. DALZELL
JOHN E.B. THORSTEINSSON
BY

ATTORNEY

Nov. 14, 1967 J. W. DALZELL ETAL 3,352,490
AUTOMATIC SET-POINT CONTROL FOR THERMOSTATS
IN ROOM-HEATING SYSTEMS
Filed Aug. 28, 1964
3 Sheets-Sheet 3

INVENTORS
JAMES W. DALZELL
JOHN E.B. THORSTEINSSON
BY
Richard M. Rabkin
ATTORNEY

United States Patent Office 3,352,490
Patented Nov. 14, 1967

3,352,490
AUTOMATIC SET-POINT CONTROL FOR THERMOSTATS IN ROOM-HEATING SYSTEMS
James W. Dalzell and John E. B. Thorsteinsson, Brandon, Manitoba, Canada, assignors to Pioneer Electric Brandon Limited, Brandon, Manitoba, Canada, a Canadian corporation
Filed Aug. 28, 1964, Ser. No. 392,735
21 Claims. (Cl. 236—68)

This application is a continuation-in-part of our application entitled Temperature Control Systems, Ser. No. 212,399 filed July 25, 1962.

This invention relates to temperature control systems and more particularly to automatic systems for providing automatic set-back of thermostat settings. While certain broad aspects of the invention are applicable to both heating and cooling apparatus, the following discussion refers to the control of heating, the preferred application of immediate interest.

Thermostats are widely used to control heating systems of a room, a household and any other enclosed space. A thermostat utilizes a temperature responsive element which senses the ambient temperature at the thermostat, and is capable of turning a heater on in response to a preset minimum ambient temperature. After the heating apparatus has operated for a time to raise the ambient temperature, the thermostat cuts off further operation of the heating system. It is a common practice to "setback" the thermostat setting in occupied areas at night, to conserve fuel. Heretofore, setback adjustment has been carried out either manually or by operation of an integrated clockwork mechanism. Clockwork mechanisms, by nature, adhere to a preset schedule. Specific provision is sometimes made for interrupting the preset clock schedule in the design of the clockwork control. When the clock-controlled schedule is interrupted i.e., to provide a warmer room for active occupants during the preset low temperature time period, the user must remember to restore control by the clockwork mechanism. It is an object of this invention to provide a temperature control system having an automatic temperature setback provision which is operable to control the setpoint of the system, in response to predetermined conditions without attention by the user.

Another object of this invention is the provision of an automatic temperature control system which is closely related to the active occupancy of the temperature-controlled area.

A further object of this invention is the provision of a thermostatic system having a first temperature setting or operating range and a novel provision for automatic setback to a second temperature setting or operating range. Yet another object of the invention is the provision of a utilized thermostat system mounted on a single wall plate for providing ambient light level responsive setback of the temperature in the direct vicinity of the thermostatic control.

The presently preferred embodiment of the invention includes a temperature control system which has provision for automatically reducing the temperature setting in response to a drop in illumination level. The temperature setting of the conrtol system will be advanced automatically when the sensed area is again illuminated. When there is sufficient daylight, the day-time setting remains in effect. When daylight ends, the night setback comes into effect. This change is not invariable, however. Where the light-sensitive control is in a room that is occupied at night by people who are awake, the control can be exposed to electric lights that are in use, and the day-time control setting becomes effective automatically for the comfort of the occupants even at night. In this manner it is possible to provide automatic night setback of temperature controls, and to suppress night setback for areas which are actively in use as indicated by lights in use.

The above and other objects and advantages of the invention in its various aspects are achieved by the illustrative embodiments which are described in detail below and shown in the accompanying drawings.

Figure 1:
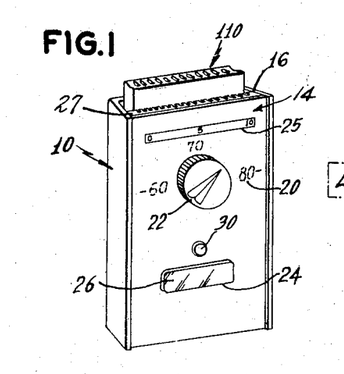
FIG. 1 is a perspective of thermostatic control means constituting an illustrative embodiment of the invention.

The embodiment of the invention in FIG. 1 includes a thermostat 10 having a casing which includes a wall mounting plate 12 and a front cover 14. Plate 12 is normally secured to the room wall and provides electrical terminals for connections to the power source and the controlled apparatus (not shown). Cover 14 has a plurality of openings 16 formed in its end walls to permit flow of air into the casing where the thermally responsive switch means 18 is mounted. The cover bears temperature indicia 20 for cooperation with the indicator of external control knob 22 of the thermally responsive switch means. Knob 22 is connected to the thermally controlled switch means of the thermostat for adjusting the temperature setting of the thermostat 10. An aperture 24 in the cover is closed by a translucent window 26 to admit ambient light to the interior of the thermostat. The light transmission characteristics of window 26 are chosen so that, with a particular circuit arrangement, the required sensitivity to ambient light is obtained. A further aperture 25 covered by a transparent plate 27 that overlies the face of the thermostat, is also provided in the front cover 14 for use with the set-back feature. The plate 27 is secured to the cover 14 as by screw 30. Indicia for indicating the mode of operation of the thermostat, i.e., the amount of set back, are associated with the aperture 25 being applied to the plate 27.

Figure 2:
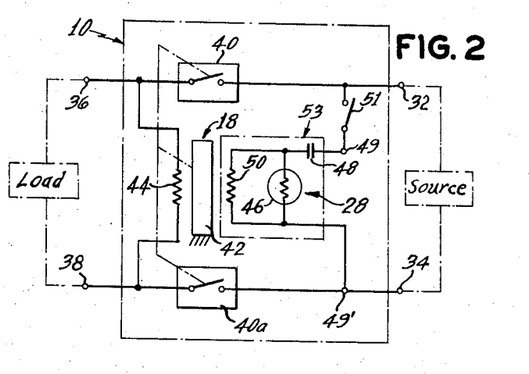
FIG. 2 is a schematic of a presently preferred embodiment of the novel temperature control system.

Referring to FIG. 2 terminals 32 and 34 are provided for connection to a power source, 60 cycles alternating current for example. Terminals 36 and 38 are provided for connection to the controlled heating system, arranged to heat the area in which the thermostat is mounted. The "load" shown in the drawing represents a furnace-control relay or solenoid valve, or a hot-water circulating pump, or in the case of "all electric" heating it represents an electric heating element or a control relay for an electric heating element. Microswitches 40 and 40a are adapted to be operated by thermally responsive bimetallic element 42. Switch 40a may be omitted if single-break control of the load circuit is acceptable. The microswitch contacts control the circuits between terminals 32 and 36 and between terminals 34 and 38. Knob 22 is used in any conventional arrangement to adjust the bimetal 42 in relation to the microswitch or switches and thereby change the set point of the thermostat. The microswitch 40 and bimetallic element 42 are part of the thermally responsive switch means 18. The bimetal 42 deflects at a predetermined rate per degree of temperature change and when it has deflected sufficiently, the microswitches 40 and 40a operate. After the bimetal temperature changes a certain number of degrees in the opposite direction, the microswitches operate reversely. A conventional heat anticipator 44 may also be provided (in this case a 100,000 ohm resistor), in parallel with the load. The purpose of the heat anticipator 44 is to shorten the heating cycle by supplying local heat to the bimetallic element while the heating system is in operation. This heats the bimetal so that it deflects toward the "off" position to thereby prevent the temperature of the area from overshooting the desired maximum ambient temperature as controlled by the thermostat.

In the embodiment of FIG. 2 the light responsive means 28 includes a photocell 46 which is connected in parallel with a resistor 50, this parallel circuit being in series with a capacitor 48 and a set back energizing switch 51. The function of switch 51 will be discussed in detail below. Light responsive means 28 including elements 46, 48 and 50 is connected between the internal terminals 49, 49'. The photocell 46 is of the photo conductive type and has a negative coefficient of resistance, that is, the resistance of the cell varies inversely with the amount of light impinging on the cell. A sharp change in resistance with change in light level is desirable to ensure a clearly defined change in the mode of operation of the thermostat. However, cadmium sulphide cells which have a relatively broad area of change have been found satisfactory in the illustrated embodiment of the invention. The photocell is mounted directly behind window 26 (FIG. 1); or the window may be made integral with the photocell by casting the cell in translucent plastic of the proper light-transmission characteristics. In a practical embodiment, resistor 50 is 50,000 ohms and capacitor 48 is 0.05 microfarad. The cadmium sulphide photocell has a resistance of approximately 8,000 ohms at 0.1 foot-candle illumination. The transmission characteristics of the window 26 is chosen so that when the thermostat is exposed to the light from a 50 watt lamp a normal room length away, little change in cell resistance will occur with increased light intensity compared to the change in cell resistance which occurs when the cell is in darkness. Typically such cells have a "dark" resistance of 500,000 ohms. At normal illumination levels the photocell is more conductive than the reistor 50 and little or no current flows through the resistor. At very low lighting levels the photocell reistance is much higher than resistor 50 and virtually all the current that is passed by capacitor 48 flows through the resistor. Resistor 50 acts as a heater, being mounted separately from but adjacent to the bimetallic element 42 for good thermal coupling. The photocell 46, capacitor 43 and resistor 50 are mounted together on a module 53, as of electrical insulating material, for conjoint movement toward and away from the bimetal. The resistor 50 is directly exposed to the bimetal 42 through an aperture in the bottom wall of the module 53 while the photocell and capacitor are relatively shielded therefrom. It will be appreciated that the ohmic value of the resistor 50 and its positioning relative to the bimetallic element 42 will have an effect on the amount of heat delivered to the bimetal. The amount of setback may be adjusted by changing the separation between the resistor 50 and the bimetal 42, as by moving the module 53, or by changing the location of the resistor from a position near the fixed-mounted end of the bimetal to a position closer to the mechanically active end of the bimetal. The heater 50 produces the same effect on bimetal 42 that an apparently higher ambient temperature would; when the heater is energized, the bimetal must deflect a greater distance in the "cold" direction before closing the switches 40 and 40a. This means that the ambient temperature must drop below the set point indicated by knob 22 before the switch will close. This provides an effective setback to a lower temperature at which the thermostat calls for heat. After heat has been supplied to the room by the heating system under control of the thermostat, the bimetal is heated by the rise in the ambient room temperature. Additional local heating is provided by anticipator heater 44 to prevent "over shoot" of the set temperature. The heat is cut off by the thermostat when the operative temperature is reached, and this turn-off point also occurs at a lower or setback point than would be the case when the ambient light level is above the operational level of the photocell.

In operation, assuming that the room in which the thermostat is installed is at the temperature coinciding with the set point of the thermostat, as indicated by knob 22, the microswitches 40 and 40a are open and no current is provided to energize the heating system. Assuming also that the room is illuminated, and the setback energizing switch 51 is closed, the small amount of current drawn through the current-limiting capacitor 48 passes largely through the photocell 46, by causing the photocell to be conductive. No appreciable current flows through the heater 50. A subsequent drop in the temperature of the room causes the bimetallic element 42 to respond and operate the microswitches 40 and 40a, thereby providing electrical current for the heating system. This also causes the heat anticipator 44 to be energized as described above.

At night-time and with the electric lights turned off in the room where the thermostat is installed, the room is in darkness. No light will fall on the photocell 46 and, because of its high resistance, little or no current will flow through the photocell 46. Most of the current will then flow through the heater 50 and the resulting heat will be transmitted to the bimetal 42. This local heating of the bimetal, will prevent it from operating the microswitches 40 and 40a although the temperature of the surrounding room has decreased below the point at which the switch would be operated if the photocell was illuminated. It will be understood that as the temperature of the room continues to drop, the decrease in ambient temperature will overcome the effect of the local heat added by the setback heater 50 and the bimetallic element 42 will move to close the microswitches 40 and 40a to energize the heating system. Thus the set point of the thermostat is shifted in accordance with whether or not the room is illuminated. Under marginal lighting conditions as at day-break and at twilight, the photocell would establish partial setback between "day" and "night" levels heretofore established manually or by clockwork controls. However, for all lighting levels above that which results from normal room-lighting, the circuit should be proportioned so that resistor 50 will not draw an amount of current to effect significant setback.

For example, if the set point of the thermostat is normally 75° and the ohmic value of the resistor 50 is such that enough heat is provided to heat the bimetallic element 42 by approximately 10°, the effective set point of the thermostat will be approximately 65° when no light is falling on the photocell 46 due to the absence of day light or electric lights in the room in which the thermostat is installed. When light rays again fall on the photocell 46 due to day light or the electric lamps being turned on in the room, current flows through the photocell 46 and resistor 50 is thereby effectively deenergized so that the effective set point of the bimetal 42 returns to the indicated value of 75°. If the set back energizing switch 51 is open then variation in the ambient light level could have no effect upon the operation of the thermostat; the thermostat could respond in a "normal" fashion to variations in the ambient temperature.

Capacitor 48 develops no significant heat under any control condition and thus may be mounted in the thermostat without introducing spurious effects. A portion of the circuit of FIG. 2 may be modified by replacing the light responsive means 46, 48 and 50 by other light-responsive means.

Figure 2A:
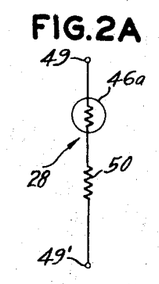
FIGS. 2a, 2b, 2c and 2d are schematics of four modifications of a portion of the system of FIG. 2.

Referring to FIG. 2a, another embodiment of the invention is illustrated as applied to the thermostat 10 of FIG. 2 wherein the photo conductive cell 46a and the heater 50 are connected in series. As in FIG. 2, heater 50 is mounted adjustably relative to the thermostat bimetal, to establish the desired heat-transfer relationship. The photocell 46a is selected from the group of such cells which have a positive photometric coefficient of resistance. Therefore as the ambient light level sensed by cell 46a falls, its resistance is lowered and more current passes through the cell to heat the associated resistor 50 to provide the desired degree of setback. While a sharp change in cell resistance at a given light level is desirable it is not essential to the operation of the device. When the photocell of FIG. 2a is sufficiently illuminated, current to the local heater 50 is drastically reduced by the increased resistance of the cell 46a, and daytime thermostatic control of the heating system is in effect.

Figure 2B:
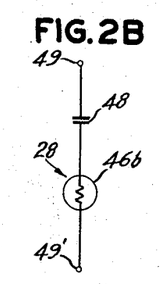

In FIG. 2b a further embodiment is shown as applied to the thermostat 10 of FIG. 2 wherein the heater 50 is omitted. Instead, the photocell 46b is positioned adjacent the bimetal 42. The photocell has a negative photometric coefficient of resistance. Capacitor 48 limits the current and, in a sense, may be regarded as establishing an approximately constant-current system. The current passing through the cell produces heat in nominal amount in bright light. The cell has relatively high resistance when it is not illuminated, and its current produces sufficient heating of the bimetal 42 to produce setback.

Figure 2C:
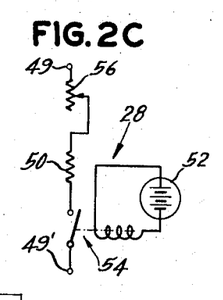

In FIG. 2c, another substitute for a portion of the circuit of FIG. 2 is shown. The photoconductive cells 46 of FIGS. 2, 2a and 2b, are replaced by a photovoltaic cell 52 in FIG. 2c. Photocell 52 is connected to energize the coil of a relay 54; or the heating resistor of a thermal relay. The relay contacts are in series with the bimetal heater 50. An adjustable resistor 56 is connected in series with the heating resistor 50. The series circuit extends to terminals 49, 49' corresponding to like terminals in FIG. 2. Adjustable resistor 56 provides an electrical means for varying the amount of setback of the thermostat. In the embodiments described before, the heater-to-bimetal relationship (50 to 42) was varied to modify their thermal coupling, and thus adjust the extent of setback mechanically. Here it is possible to adjust the extent of setback electrically, by adjusting the rheostat 56. Electrical control over the extent of setback may be effected in FIGS. 2, 2a and 2b similarly, by adding a heater-controlling rheostat.

In the embodiment of FIG. 2c, a sharply defined operation point for the setback is provided by use of relay 54. The relay contacts are either open or closed, depending on whether enough current flows through the coil of the relay to keep the contacts open and the heater 50 de-energized. When the light level falls to the point where cell 52 no longer generates this level of current then the contacts of the relay close, abruptly energizing the heater 50 to produce the desired setback. There is no marginal light-level that would provide a partial extent of setback. The operation point of the setback may be adjusted by adjusting the sensitivity of the relay 54. While an electromechanical relay 54 is shown interposed between the light sensing element 52 and the heater 50 it will be obvious to those skilled in the art that other devices, such as biased amplifiers or the like, having suitable characteristics may be substituted.

Figure 2D:
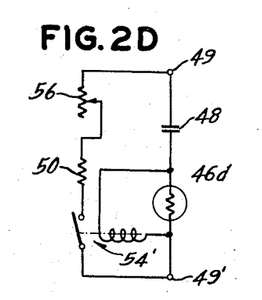

The embodiment illustrated in FIG. 2d is shown as applied to the thermostat 10 of FIG. 2, in the "illuminated" condition. The operating coil of relay 54' having normally open contacts is connected in parallel with a photo-conductive cell 46d which has a negative coefficient of resistance. When illuminated, the cell 46 draws a major part of the current passed by current-limiting capacitor 48, and therefore the heater circuit is opened.

When the ambient light level drops, the relay is activated because the cell resistance increases. The relay contacts close and energize the heater 50. This embodiment provides a sharply defined light level at which set back will occur.

Figure 6:
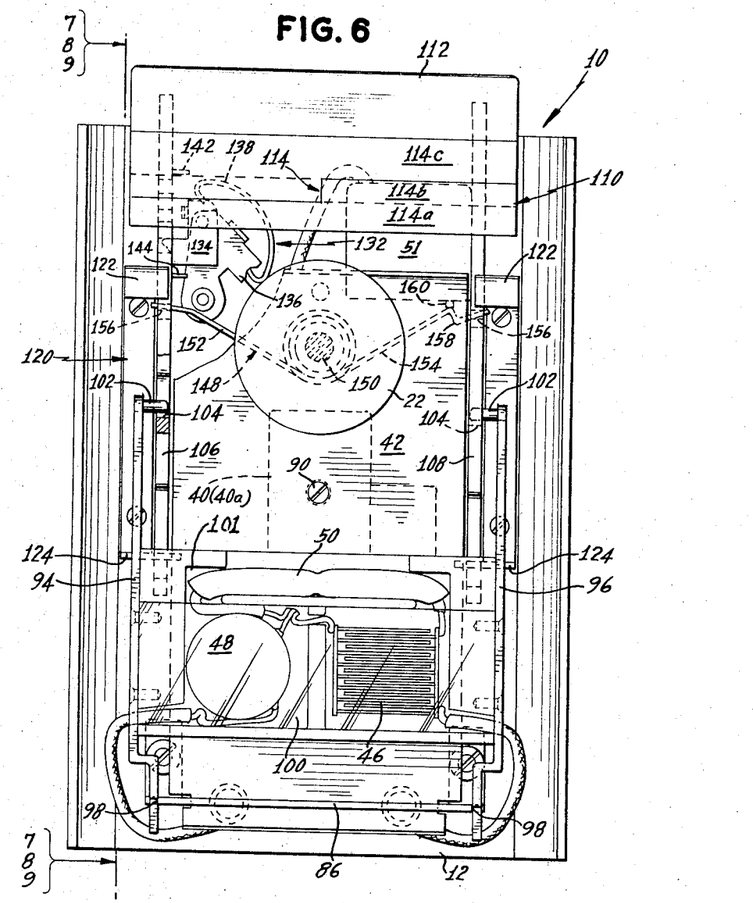
FIG. 6 is a plan view of the thermostat of FIG. 1 with the casing cover removed.

Referring to FIGS. 1 and 6 through 10, a presently preferred embodiment of the invention will be described in detail. The main bimetal 42 is mounted at one end on plate 12 by a bracket 86. The normal set point of the thermostat 10 is adjusted by knob 22 which has a cam-shaped portion 88 that bears against the bimetal 42 and thereby changes the position of the bimetal and the amount of bimetal flexing required to operate the switches 40, 40a. The temperature response of the bimetal is transferred to the switches, which are mounted behind the plate 12, by the calibrating screw 90. The heat anticipating resistor 44, not visible in FIG. 6, is mounted between the bimetal 42 and the back plate 12.

Set back resistor 50, photocell 46, and capacitor 48 are mounted in a module 92, of insulation, carried by spaced arms 94, 96 that are pivoted at 98 on bracket 86. A sheet of transparent mica 100 covers the face of the module and overlies the photocell 46 and capacitor 48 for electrical insulating purposes. The set back resistor is exposed to the bimetal 42 through an aperture 101 in the module 92. Each of the arms 94, 96 terminates in a cam follower 102 that engages the operative surfaces of a cam slot 104 formed in the legs 106, 108 of the function selector carriage 110. The cam followers 102 closely conform to the cam slots 104. Carriage legs 106, 108 are joined together by a transverse member 112 which bears a patterned indicia 114 on its broad face and which has a narrow end face 116 which extends beyond the cover 14 for finger engagement by the operator. The indicia 114 has two stepped patterns of contrasting color that cooperate with the aperture 25 and associated index markings on the cover 14. The stepped zones provide three areas as indicated by the broken lines in FIG. 6. The first area 114a is solidly one color, the second area 114b is one-half of the first color and one-half of the second color, and their area 114c is solidly of the second color. End face 116 of the carriage 110 is perforated at 118 so as to allow free circulation of air therethrough. The carriage 110 is slidably retained on the back plate 12 by a pair of opposed brackets 120 that also limit the travel of the carriage. Each bracket 120 is provided with a pair of spaced portions 122, 124 which overlie the legs 106, 108 of the carriage.

The left leg 106 of the carriage 110 is provided with a series of notches 126, 128, 130 which cooperate with latch means 132 to retain the carriage in any one of three selected positions corresponding to three different modes of thermostat operation. The latch means (FIG. 10) includes a pawl 134 which is pivoted on a base member 136. Pawl 134 and member 136 form an overcentering linkage wherein the pawl is either urged into engagement with the carriage leg 106 or retracted therefrom, by a U-shaped spring 138. The retracted position of the pawl is determined by a stop 140 formed on the base member, while the projected position of the pawl is limited by engagement with the leg 106. The latch means 132 is driven between its two positions by pins 142, 144 on the leg 106 which engage an upturned part 146 of the pawl.

The function selector carriage 110 is moved inwardly of the thermostat casing by finger pressure of the operator while setting the mode of operation and degree of set back desired. The function selector is returned to its extended position (FIG. 1, FIG. 6) by a return spring 148 when the latch means 132 is disengaged. Spring 148 is held in position between the bimetal and back plate 12 by being wound about the knob stem and mounting shaft 150. The spring has a pair of oppositely extending legs 152, 154 which engage apertures 156 in the carriage legs 106, 108. Spring leg 154 has a sharply bent portion 158, which in one position of the carriage, engages the operating plunger 160 of the set back energizing switch 51.

Figure 7:
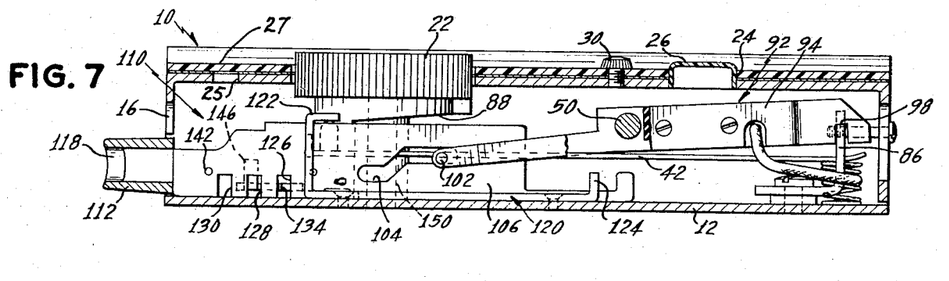
FIGS. 7, 8, 9 are progressive side views, in partial section and with some parts omitted, of the thermostat of FIG. 6 as viewed along the respective lines 7—7, 8—8 and 9—9.
Figure 8:
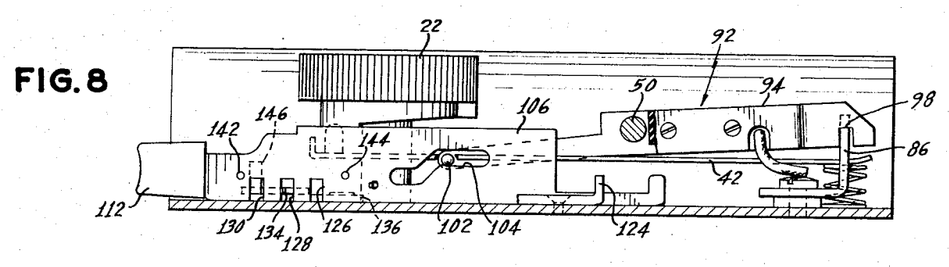

In the presently preferred embodiment of the invention, illustrated in FIG. 6, three modes of operation are available. In the first mode of operation the function selector 110 is at its maximum extension relative to the thermostat as shown in FIGS. 1, 6 and 7 and the latch means 132 engages notch 126. At this time the solid colored area 114a of the function selector is visible through the aperture 25. With the function selector carriage in its position of maximum extension, spring 148 engages the plunger 160 of the set back switch 51 causing the switch to be held open and thereby effectively disconnecting the set back circuitry. In this mode of operation the thermostat functions in a normal manner being responsive only to the ambient temperature.

In the second mode of operation the function selector 110 is depressed until the latch means 132 engages the notch 128 (FIG. 8) locking the function selector in position with the indicia zone 114b visible through the aperture 25 in the case. This zone is half and half of contrasting colors which give indication through the aperture that the thermostat is now in its first set back position. When the selector 110 moves from the original fully extended position to the first set back position, the return spring 148 is moved relative to the set back switch 51 and is disengaged therefrom allowing the circuit to the set back network to be completed. By virtue of the contour of cam slot 104 the movement of the carriage does not result in significant displacement of the resistor 50 toward or away from the bimetal 42. In this mode of operation the thermostat would provide a given amount of set back when the photocell is activated, i.e., when the light level incident upon the illustrative photocell through the translucent window 26 falls below approximately 1/10 footcandle. This has been found to be particularly advantageous since it is approximately equivalent to the light from a 50 watt lamp an average room length away with the thermostat wall mounted. The operative light level may be changed with a given photocell by changing the light transmission characteristics of the window 26. In a presently preferred embodiment this mode of operation produces a 5° set back when the ambient light level falls below the predetermined amount given above.

Figure 9:
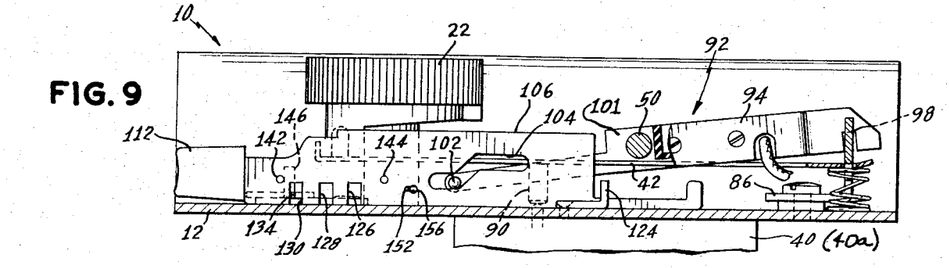
Figure 10:
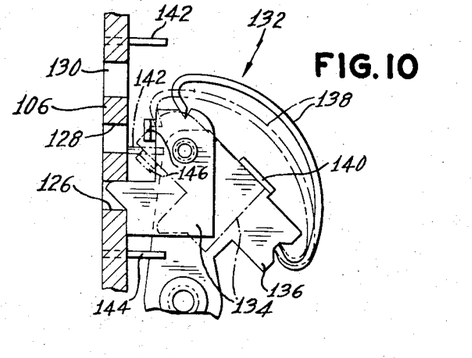
FIG. 10 is a plan view, on a greatly enlarged scale, of the latch means.

In the third mode of operation the function selector carriage 110 is further depressed into the thermostat casing until the latch means 132 engages the third notch 130 in the carriage leg as shown in FIG. 9. During the further inward movement of the carriage the set back switch 51 remains energized since the leg 154 of the return spring 148 is moved further from the plunger 160 of the switch. However, the cam slot contour 104 is such that the cam followers 102 pivot arms 94, 96 and the resistor 50 is moved closer to the bimetal 42 thus changing the heat transfer relationship previously established in the position shown in FIGS. 7 and 8. At this time indicia zone 114c is visible through the aperture 25 and indicates that the thermostat is in the third mode of operation. In this mode of operation, with the same electrical energization of the set back resistor 50, a further degree of set back is achieved when the ambient light level falls below the 1/10 foot candle operating point of the embodiment. In the presently preferred embodiment illustrated in the drawings approximately a 10° set back is achieved by decreasing the separation between the heater 50 and bimetal 42.

When a return to the "normal" no-set back mode of operation from the maximum set back mode is desired, the function selector carriage 110 is further depressed into the case of the thermostat until pin 142 on leg 106 engages the projection 146 on the latch means 132 causing the member 134 to overcenter and thereby withdraw the pawl to a position remote from the notches. As the operator relaxes his finger pressure on the function selector, the carriage is returned to the first mode of operation position by the return spring 148. Pin 144 on leg 106 engages the projection 146 and resets the latch means 132 so that the latch means 132 engages notch 126. If it is desired to return to the "normal" mode of operation from the first set back position, it is necessary to fully depress the function selector 110 in order to release the latch means 132.

When the function selector 110 returns to the "normal" position (FIG. 7), plunger 160 of the set back switch 51 is engaged by the spring 154 and shifted to a position wherein the switch 51 is opened thus de-energizing the set back circuitry. During the return to normal operation, the cam slot 104 and cam followers 102 cooperate to shift the set back resistor from its position adjacent the bimetal 42 to its relatively more remote position.

Figure 3:
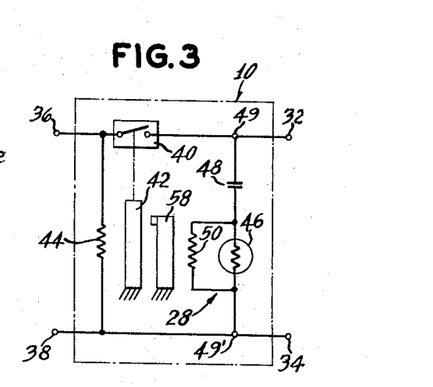
FIGS. 3, 4 and 5 are schematics of further illustrative embodiments of the invention.

In FIG. 3 yet another embodiment is illustrated. An auxiliary bimetal 58 is interposed between the heater 50 and the main bimetal 42. The auxiliary bimetal 58 has the same temperature response characteristic as the main bimetal. It is mounted adjacent to but normally spaced from the main bimetal 42. It is adapted to push against the main bimetal when deflected by heat from heater 50. Therefore a marginal amount of current may flow through the heater 50 without effecting setback but a greater amount of current (indicating a large change in ambient light level) will cause sufficient heat to have the auxiliary bimetal push against the main bimetal. Switch 40 is arranged in relation to the main bimetal 42 so as to be operated when the bimetal becomes cooler. The auxiliary bimetal, when deflected into contact with the main bimetal, resists the effort of the main bimetal to close switch 40 until the setback temperature is reached.

Figure 4:
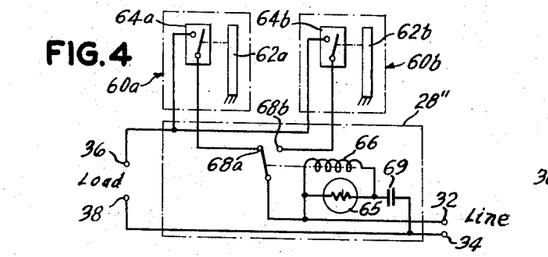

The embodiment of the invention shown in FIG. 4 employs two thermostats 60a and 60b which may or may not be identical. While it is contemplated that they will be mounted together as portions of a common unit, it is possible that one of the thermostats may be mounted separately as where automatic setback is to be added to an existing installation that has no provision for setback. Each thermostat 60a or 60b incorporates a thermally responsive element 62a or 62b which is coupled to a microswitch 64a or 64b. Interconnecting thermostats 60a and 60b is a light responsive means 28". The light responsive means 28" includes a photocell 65 connected in parallel with the coil of relay 66, these in turn having a series-connected current-limiting capacitor 69. Relay 66 has contacts 68a and 68b which are connected in series with the microswitches 64a and 64b, respectively, of the thermostats 60a and 60b and one of these microswitches (depending on which relay contact is closed) controls current from the line to the heating system as represented by "LOAD" in the drawing. The relay contacts preferably are of a snap-acting type so that either one or the other is definitely closed. Operation of the relay 66 is dependent upon the ambient light level as sensed by photocell 65. Photocell 65 has a negative coefficient of resistance. As shown in FIG. 4 the apparatus is in its day or illuminated position i.e., with the relay 66 de-energized so that the microswitch 64a of thermostat 60a is connected in the heating system. The room or area temperature will be determined by the set point of thermostat 60a. When the ambient light level drops and the resistance of the cell increases to the point where the relay 66 is energized to close contact 68b, thermostat 60b is placed in the circuit in place of thermostat 60a. The temperature at which thermostat 60b has been set becomes the set point for the temperature control system. The difference between the setting of thermostats 60a and 60b is the night setback for the system.

Figure 5:
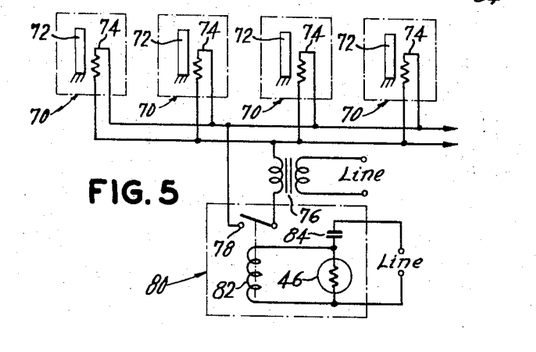

The embodiment shown in FIG. 5 is suitable for obtaining setback in large areas such as auditoriums and the like where plural independent heating units are employed and where each heating unit is controlled by its own thermostat 70. Each thermostat 70 is similar to the previously described thermostats except that the light responsive means 28 is omitted. However each thermostat is provided with a bimetal 72 and a setback heat source 74. Ambient temperature changes cause the bimetal to operate the associated apparatus (not shown) for correcting the ambient temperature to the set point of the thermostat. In such multiple-unit installation it is desirable that one light responsive unit be used to monitor the ambient lighting level so as to assure simultaneous setback of all the units when the ambient light level in the area drops below a predetermined level. This is achieved by connecting the local heat source resistors 74, which function similar to the previous described heat-source resistor 50, in parallel through low voltage wiring to the secondary of a transformer 76, to relay contacts 78 contained in a light responsive means 80. The light responsive means 80 includes a photocell 46 having a negative coefficient of resistance which is connected in parallel with relay coil 82. The relay coil and photocell are connected in series with a current limiting capacitor 84. When the lighting level has dropped to a predetermined point then the photocell is no longer conductive and a voltage appears across the relay coil which energizes the low voltage wiring so that each of the local heat source resistors 74 is activated to produce the desired setback effect previously described. Each thermostat 74 still responds independently to the temperature in its area but all the setbacks are activated simultaneously. This system provides master control of the operative temperature setting of each local thermostat without interfering with the independent operation of the thermostats in controlling the ambient temperature in its area. This system like all the others described above includes the photoelectric control means and the thermostatic control means in the same space as that which is heated by the controlled heating system. Automatic setback of the thermostatic control means in all these embodiments is under control of the ambient light in the heat-controlled space. The ambient light suppresses setback both during daylight conditions and at night when the room lights are turned on. The photoelectric control does not turn the heat on or off, but instead modifies the thermostatic control of the heating system, by introducing a setback during periods of darkness.

Although several embodiments of the broad aspects of the invention have been shown and described, it will be appreciated that each of the embodiments has particular merits; and it will be understood that various changes and modifications may be made therein by those skilled in the art without departing from the spirit of the invention.

The embodiments of the invention in which an exclusive property or privilege is claimed are defined as follows:

1. A heating system for a confined space for the comfort of people occupying such space, including thermostatic control means for controlling system operation by establishing a first set-point to maintain a first average temperature in said space and means for automatically modifying the control effected by said thermostatic means by establishing a second set-point to maintain a second average temperature in said space, said heating system including separate heaters at different locations in the space, said thermostatic means including a plurality of individual thermostats spaced apart in said space and connected in control of said separate space heaters, respectively, and a means for modifying the response of each said thermostat to the ambient temperature at its location, said modifying means including a photocell in said space arranged to respond to the ambient light, and means controlled by said photocell to produce local heating in said thermostats during periods of darkness to effect individual but coordinated set-back thereof, said modifying means including said photocell and said local heating means being responsive to the ambient light level of the space in one manner when the space is in darkness to establish said second set-point and in a different manner when exposed to a minimum level of ambient light at and above the level provided by customary ambient artificial lighting means in said space when used by active people for establishing said first set-point above said second set-point.

2. A thermostat having a pair of line terminals and a pair of load terminals, said thermostat including a switch for electrically connecting said line terminals to respective ones of said load terminals, ambient temperature responsive means for closing said switch on a fall in temperature and for opening said switch on a rise in temperature above or below a desired set point, a set back electrical heater positioned adjacent said temperature responsive means in heat transfer relationship therewith, circuit means for selectively connecting said setback heater between one of said pairs of terminals for energization, said circuit means including mechanically operable switch means and light responsive current-control means, said light responsive current-control means producing in said heater one current condition at all light levels at and above a level of 1/10 foot-candle and a second current level when in substantial darkness, the second current level causing the heater to establish a lower set-point of operation of the ambient temperature responsive means than that established by said one current condition, said mechanical switch means providing for selecting thermostat operation with light level responsive set back control in one position thereof and for selecting thermostat operation without light level responsive set back in another position.

3. A thermostat including a casing and having a pair of line terminals and a pair of load terminals, said thermostat including a switch for electrically connecting said line terminals to respective ones of said load terminals, ambient temperature responsive means for closing said switch on a fall in temperature and for opening said switch on a rise in temperature above or below a desired set point, function selector means mounted in said casing and having a portion extending therefrom, said function selector means being selectively positionable relative to said casing, an electrical heater, movable mounting means in said casing for said heater coupled to said function selector means for movement of said heater between a position adjacent said temperature responsive means in heat transfer relationship therewith and a relatively remote position in reduced heat-transfer relation therewith, circuit means in said casing for selectively connecting said heater between one of said pairs of terminals for energization, said circuit means including serially electrically connected mechanical switch means operable by said function selector means and light responsive current-control means, said light responsive current-control means producing in said heater one current level at all light levels at and above a level of 1/10 foot-candle and a higher second current level when in darkness, said higher current level affecting said ambient temperature responsive means to provide a night set-back set point lower than the set-point in effect during said one current level, said mechanical switch means providing for activation of said light responsive current-control means, said function selector means coupled to said switch means and said mounting means for coordinating operation of said switch means and said mounting means for providing selection of alternate modes of thermostat operation, one position of said function selector providing normal thermostat operation with said electrical heater relatively remote from said temperature responsive means and said light responsive current-control means deactivated, a second position of said function selector providing a first degree of set back operation with said electrical heater relatively remote from said temperature responsive means and said light responsive means activated, and a third position of said function selector providing a greater second degree of set back operation with said electrical heater relatively close to said temperature responsive means and said light responsive means activated.

4. A thermostat having a pair of line terminals and a pair of load terminals, said thermostat including a switch for electrically connecting said line terminals to respective ones of said load terminals, ambient temperature responsive means for closing said switch on a fall in temperature and for opening said switch on a rise in temperature above or below a desired set point, a set back electrical heater, means for moving said heater between a first location a given distance from said temperature responsive means and a second location a lesser distance from said temperature responsive means, said heater being in heat transfer relationship with said temperature responsive means in both said positions, circuit means for selectively connecting said heater between said load terminals for energization, said circuit means including mechanically operable switch means and light responsive switch means, said light responsive switch means assuming one conductive condition at light levels above a level of 1/10 foot-candle and a second conductive condition at light levels there below for energizing said set back heater in response to light level, said mechanical switch means providing for selection of thermostat operation with light level responsive set back in one position thereof and for selection of thermostat operation without light level responsive set back in another position, means for coordinating the sequential operation of said mechanically operable switch means and the means for moving said heater whereby in a first condition of said coordinating means said heater is in said first location and said mechanical switch means is open, in a second condition of said coordinating means said heater is in said first location and said mechanical switch means is closed, in a third condition of said coordinating means said heater is in said second location and said mechanical switch means is closed, said coordinating means providing normal thermostat operation in said first condition, a given amount of light level responsive set back in said second condition, an a greater amount of light level responsive set back in said third condition, respectively.

5. A heating system for a room provided with a minimum level of ambient illumination when used by active people, such as the illumination provided by customary ambient artificial lighting means or by an equivalent intensity of daylight, said heating system including thermostatic control means for turning on and off the heating system at temperatures below and above a set-temperature level, and set-point control means coupled to said thermostatic control means including a light-responsive element exposed to ambient room light, for establishing one set-temperature level of operation of said thermostatic control means in response to said minimum and all higher levels of ambient illumination and to establish a reduced set-temperature level of thermostatic control when the room is in darkness.

6. A heating system for a room provided with a minimum level of ambient illumination when used by active people, such as that provided by customary ambient artificial lighting means, said heating system including thermostatic control means having a control bimetal and switching means operable thereby for turning on and off the heating system at temperatures below and above a set-temperature level, and set-point control means having a photocell exposed to the ambient room light, said set-point control means including a heating element disposed in heat-transfer relation to said bimetal, said photocell being connected to said heating element for controlling the heating current therein for establishing one set-temperature level of operation of said thermostatic control means when said light-responsive means senses said minimum and all higher levels of ambient illumination and to establish a reduced set-temperature level of thermostatic control when the room is in darkness.

7. A system for controlling the ambient environment for a room having windows for admitting daylight, said system including a source of artificial light in the room for providing at least the customary minimum level of ambient room lighting when used by active people, a heating system for said room, said heating system including ambient-temperature responsive control means for maintaining a set temperature in said room, and light-responsive set-temperature control means arranged to adjust said ambient-temperature responsive control means for establishing either a first average temperature when the room is in darkness or a second higher average temperature when said artificial light source is on and at all other times when the ambient room light level equals or exceeds that of said artificial light source, said light responsive means including a light-sensing element exposed to the ambient light in the room and further including circuit means controlled by said light sensing element for controlling said ambient-temperature responsive control means in establishing one of said average temperatures, as aforesaid.

8. A heating system for a room provided with a minimum level of ambient illumination when used by active occupants, equal to the illumination provided by customary ambient artificial lighting means or by an equivalent intensity of daylight, said heating system including thermostatic control means having a control bimetal for turning on and off the heating system at temperatures below and above a set-temperature level, and light-responsive means coupled to said thermostatic control means including a circuit comprising a heating resistor and a photoresistor having a negative light coefficient of resistance connected in parallel and a current-limiting impedance connected in series with said parallel-connected heating resistor and photoresistor, and means for connecting said circuit to an electrical power source, the heating resistor being disposed in heat-transfer relation to said control bimetal, and said circuit being proportioned to establish a first set-temperature level of operation of said thermostatic control means in response to said minimum and higher levels of ambient illumination and to effect set-back of said first set-temperature level when the room is in darkness.

9. A thermostatic system for controlling the heat supplied to a room for automatically establishing selectively either a "night" set-point or a "day" set-point higher than said "night" set-point when the room is occupied by active people, said thermostatic system including thermostatic switching means for controlling a source of heat for the room, the thermostatic switching means including switching means and room temperature responsive means in control relation to said switching means, a light-sensitive cell adapted to sense the ambient light of a room, and set-point control means including said light-sensitive cell for establishing the "night" set-point when the room is effectively in darkness and, selectively, for establishing the "day" set-point in response to ambient light incident on the light-sensitive cell where the incident light is due to artificial room lighting adapting the room for use by active people or to daylight in the room of all intensities equal to and exceeding the artificial room lighting.

10. A thermoplastic system in accordance with claim 9, wherein said light-sensitive cell is a resistive element disposed in heat-transfer relation to said room temperature responsive means and adapted to heat said room temperature responsive means and wherein said light-sensitive cell has a sharp change in its response to a particular light level for providing sharply changed heating of the ambient temperature responsive control means during periods of darkness and during periods of ambient light of a level adapting the room to occupancy by active people.

11. A thermostatic system in accordance with claim 9 wherein said thermostatic switching means includes two bimetal-controlled switches adjusted for operation at said "night" and said "day" set-points, respectively, and wherein said set-point control means includes a selective switch for rendering either one or the other of said two switches operative to provide control for the source of room heat.

12. A thermostatic control for the heat-supply means of a room, including an ambient-temperature responsive thermostatic switch operable to open and close at the differential temperature limits of a set-point and including a temperature-responsive element, an electrical heater adjacent the temperature-responsive element for modifying the ambient temperature thereof, a light-sensitive cell adapted to sense the ambient illumination of a room, and set-point selection means including said light-sensitive cell for establishing a first current condition in said electrical heater to establish a "night" set-point when the room is in darkness and for establishing a different current condition in said electrical heater and thereby to establish a "day" set-point higher than said "night" set-point in response to artificial illumination of the room when in use by active people and in response to all levels of daylight that equal or exceed the artificial room illumination.

13. A thermostatic control in accordance with claim 12 further including means for adjusting the heat-transfer relation between the electrical heater and the temperature-responsive element for thereby controlling the difference between said "night" set-point and said "day" set-point.

14. A thermostatic control in accordance with claim 12 wherein said thermostatic switch is adjustable to establish one of said set-points at a desired temperature, the other set-point being established at a coordinately adjusted temperature.

15. A thermostatic system for controlling the heat supplied to a room for establishing one set-point when the room is in darkness and a higher set-point when the room is occupied by active people and is illuminated, said thermostatic system including thermostatic switching means for controlling a source of heat for the room, the thermostatic switching means including switching means and a bimetal for controlling said switching means, a light-sensitive cell, and set-point control means for establishing a "night" set-point when the room is in darkness and for establishing a "day" set-point in response to artificial room lighting and in response to daylight in the room of all intensities equal to and above that of the artificial room lighting, said set-point control means including said light-sensitive cell, a heating resistor disposed in heat-transfer relation to said bimetal, and a current-limiting impedance, said light-sensitive cell and said heating resistor being connected in parallel and said current-limiting impedance being connected in series therewith, said light-sensitive cell being substantially nonconductive in comparison to said resistor when in darkness and said light-sensitive cell being proportioned relative to said resistor and said current-limiting impedance to pass virtually all the current in said current limiting impedance whenever the ambient light level in the room equals or exceeds that of the artificial room lighting used by active occupants of the room.

16. In combination, a room having heating means, artificial room-lighting means, only a single thermostat in control of said heating means and exposed to the ambient temperature of the room for turning on and off the heating means, a light-sensitive cell exposed to the ambient light in the room resulting from daylight and from the artificial room-lighting means, a heating resistor disposed in heat-transfer relation to said thermostat for modifying the ambient temperature to which the thermostat is otherwise exposed, and set-point control means including said light-sensitive cell and said resistor for selectively energizing said heating resistor in dependence on the light sensed by the light-sensitive cell to establish a "night" set-point when the room is in darkness and to establish a "day" set-point when said room is illuminated by said artificial lighting means or by daylight of equal or any greater intensity at the light-sensitive cell.

17. A system for controlling the operation of room heat-supply means, said system including a single room-temperature responsive thermostat for the heat-supply means, artificial room-lighting means for adapting the room to use at night by active occupants, a light-sensitive cell exposed to ambient light in the room resulting from daylight and from the artificial room-lighting means, said thermostat including only a single temperature-responsive device, a heater adjacent said device for modifying the effect of the ambient room temperature thereon, and set-point selecting means including said heater and said light-sensitive cell for establishing either a "night" set-point of operation of the temperature-responsive device when the room is effectively in darkness or a "day" set-point of operation of the temperature-responsive device when the ambient light in the room equals or exceeds that provided by said artificial room-lighting means.

18. A thermostatic control for the heat-supply means of a room, including an ambient-temperature responsive thermostatic switch operable to open and close at the differential temperature limits of a set-point and including a temperature-responsive element, an electrical heater adjacent the temperature-responsive element for modifying the ambient temperature thereof, a light-sensitive cell adapted to sense the ambient illumination of a room, and set-point selection means including said light-sensitive cell for establishing a first current condition in said electrical heater to establish a "night" set-point when the room is in darkness and for establishing a different current condition in said electrical heater and thereby to establish a "day" set-point higher than said "night" set-point in response to artificial illumination of the room when in use by active people and in response to all levels of daylight that equal or exceed the artificial room illumination, said electrical heater and said light-sensitive cell being connected in parallel, and a common current-limiting impedance being connected in series therewith.

19. A thermostat having a pair of line terminals and a pair of load terminals, said thermostat including a load control switch operable between open and closed conditions and effective when closed to connect at least one of said line terminals to a corresponding one of said load terminals, a bimetal for operating said switch between open and closed conditions in response to ambient temperature changes, a set-back circuit including an electrical heater, means for moving said heater between a first location a given distance from said bimetal and a second location a lesser distance from said bimetal, said heater being in heat transfer relationship with said bimetal in both said positions, a mechanical switch for selectively connecting or disconnecting said set-back circuit to one of said pairs of terminals, said set-back circuit including light responsive means operative to control energization of said heater in one manner at all levels of illumination at and above the minimum level of artificial illumination used by active people in a room, said light responsive means being operative to control energization of said heater in a different manner when in darkness, said mechanical switch providing for selection of thermostat operation with light level responsive set-back in one position thereof and for selection of thermostat operation without light level responsive set-back in another position, means for coordinating the sequential operation of said mechanical switch and the means for moving said heater so that in a first condition of said coordinating means said mechanical switch is open, in a second condition of said coordinating means said heater is in said first location and said mechanical switch is closed, and in a third condition of said coordinating means said heater is in said second location and said mechanical switch is closed, said coordinating means providing a normal thermostat operation in said first condition, and said coordinating means providing either normal thermostat operation or two different levels of set-back in said second and third conditions of the coordinating means, each of said two different levels of set-back being rendered effective or ineffective in dependence on whether the light responsive means is in darkness or exposed to illumination at or above said minimum level.

20. A thermostatic control for controlling the supply of heat in a room provided with a minimum level of ambient light when used by active people, such as is provided by customary ambient artificial lighting means as well as all levels of daylight at and above that provided by such artificial lighting means, including thermostatic means and switching means controlled thereby for controlling the supply of room heat, and a night set-back circuit including a photocell disposed to respond to the ambient light at said thermostatic means, and circuit means controlled by said photocell for establishing a night set-back set-point of operation of said switching means by said thermostatic means when said photocell is in darkness and for establishing a daytime set-point higher than the night set-back set-point when the photocell is exposed to all levels of ambient light at and above said minimum level of ambient light.

21. A thermostatic control for the heat supply of a room provided with a minimum level of ambient light when used by active people, such as that provided by customary ambient artificial lighting means and all levels of daylight at and above the minimum level, including thermostatic means and a pair of heat-supply control switches controlled thereby, one of said switches establishing a night-time set-point and the other of said switches establishing a higher day-time set-point, and photoelectric control means including a photocell exposed to ambient room light and switching means controlled thereby for rendering only said one of said switches effective to control the heat supply when said photocell is in darkness and to render only said other of said switches effective to control the heat supply when said photocell is exposed to a substantial level of ambient light at and above said minimum level of ambient light.

References Cited

UNITED STATES PATENTS

| | | | |
|---|---|---|---|
| 1,597,773 | 8/1926 | Dodge | 236—47 X |
| 1,720,723 | 7/1929 | Dodge. | |
| 1,876,636 | 9/1932 | Dicke | 236—68 X |
| 2,205,164 | 6/1940 | Chappell et al. | 236—68 X |
| 2,301,383 | 11/1942 | Dillman | 236—68 X |
| 2,518,996 | 8/1950 | Peckham | 236—15 |
| 3,009,332 | 11/1961 | Spiegelhalter | 62—180 |
| 3,063,195 | 11/1962 | Ravich | 47—17 |
| 3,080,491 | 3/1963 | Howell | 317—124 X |

FOREIGN PATENTS

| | | |
|---|---|---|
| 943,252 | 5/1956 | Germany. |

MEYER PERLIN, *Primary Examiner.*

ALDEN D. STEWART, *Examiner.*